United States Patent
Arai

(10) Patent No.: US 7,095,711 B1
(45) Date of Patent: Aug. 22, 2006

(54) COMMUNICATION METHOD AND APPARATUS FOR A RADIO LOCAL AREA NETWORK SYSTEM USING MACRODIVERSITY

(75) Inventor: Koji Arai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/796,752

(22) Filed: Feb. 6, 1997

(30) Foreign Application Priority Data

Jul. 18, 1996 (JP) .................................. 8-189423

(51) Int. Cl.
*H04J 3/14* (2006.01)

(52) U.S. Cl. .................... 370/217; 370/542; 341/61

(58) Field of Classification Search ................ 370/338, 370/465, 468, 542 X, 543, 544, 315, 336, 370/339, 360, 538, 536, 540, 217, 220, 242, 370/243, 328, 329, 545; 375/299; 455/101, 455/561; 341/337, 61
See application file for complete search history.

(56) References Cited

U.S. PATENT DOCUMENTS

| | | | | |
|---|---|---|---|---|
| 4,385,381 A * | 5/1983 | Alexis | ........................ | 370/544 |
| 4,777,634 A * | 10/1988 | Burger et al. | ................ | 370/102 |
| 4,890,283 A * | 12/1989 | Tsinberg et al. | ............ | 370/538 |
| 4,977,558 A * | 12/1990 | Iguchi et al. | ................ | 370/542 |
| 5,184,347 A * | 2/1993 | Farwell et al. | ............... | 370/335 |
| 5,220,566 A * | 6/1993 | Ikenoue | ....................... | 370/112 |
| 5,265,095 A * | 11/1993 | Fiedler et al. | .............. | 370/536 |
| 5,291,515 A * | 3/1994 | Uchida et al. | ............... | 370/479 |
| 5,295,154 A * | 3/1994 | Meier et al. | ................. | 370/338 |
| 5,400,024 A * | 3/1995 | Nishimura et al. | ......... | 455/561 |
| 5,425,031 A * | 6/1995 | Otsuka | ........................ | 370/336 |
| 5,434,859 A * | 7/1995 | Levardon | .................... | 370/468 |
| 5,475,676 A * | 12/1995 | Takatori et al. | ............. | 370/222 |
| 5,483,668 A * | 1/1996 | Malkamaki et al. | ........ | 370/337 |
| 5,490,183 A * | 2/1996 | Nishimura et al. | ......... | 375/377 |
| 5,539,751 A * | 7/1996 | Sabel | ....................... | 370/105.4 |
| 5,577,022 A * | 11/1996 | Padovani et al. | ........... | 370/332 |
| 5,577,047 A * | 11/1996 | Persson et al. | ............. | 370/337 |
| 5,583,851 A * | 12/1996 | Kato et al. | ................... | 370/468 |
| 5,648,962 A * | 7/1997 | Pirinen | ........................ | 370/336 |
| 5,680,400 A * | 10/1997 | York | ........................... | 370/465 |
| 5,757,785 A * | 5/1998 | Sugihara | ..................... | 370/315 |

(Continued)

FOREIGN PATENT DOCUMENTS

JP      02-005642      1/1990

(Continued)

OTHER PUBLICATIONS

Japanese Office Action dated Mar. 15, 2002 (2 pp) for corresponding Japanese Patent Application No. 8-189423.

*Primary Examiner*—Doris H. To
*Assistant Examiner*—Phuongchau Ba Nguyen
(74) *Attorney, Agent, or Firm*—Staas & Halsey LLP

(57) ABSTRACT

A communication method for a radio LAN system provides communication at a first transmission rate. In the method, a first signal of the first transmission rate is time-divisionally distributed into n−1 second signals (n=3, 4, . . . ). The n−1 second signals are respectively converted into n−1 third signals of a second transmission rate less than the first transmission rate. The n−1 third signals of the second transmission rate are also transmitted through radio transmission paths between n−1 radio base stations and a terminal station connected to at least one terminal unit.

7 Claims, 13 Drawing Sheets

U.S. PATENT DOCUMENTS 5,771,225 A * 6/1998 Iino ............................ 370/217
5,799,005 A * 8/1998 Soliman ...................... 370/335
5,926,470 A * 7/1999 Tiedemann, Jr. ............ 370/334

FOREIGN PATENT DOCUMENTS

JP           08-172390           7/1996

* cited by examiner

FIG. 4

RADIO BASE STATION 1    1 1 0 0 1 0 1 0 1 1 0 0 1 0 0 1
RADIO BASE STATION 2    0 1 1 0 0 0 1 1 0 1 0 1 0 0 1 1
RADIO BASE STATION 3   + 1 1 1 0 1 1 0 0 1 1 0 0 1 0 1 1 0

REDUNDANT RADIO BASE STATION n    0 1 1 1 0 0 0 0 0 0 0 0 1 1 0 0

COMMUNICATION METHOD AND APPARATUS FOR A RADIO LOCAL AREA NETWORK SYSTEM USING MACRODIVERSITY

BACKGROUND OF THE INVENTION

1. Field of the Invention

The present invention generally relates to a communication method and apparatus for a radio local area network (LAN) system, and more particularly, to a communication method and apparatus for a radio local area network (LAN) system, in which transmission performance may be improved by macrodiversity using a plurality of radio base stations.

2. Description of the Related Art

Recently, in a radio LAN system using a millimeter-wave band (for example, 30 GHz to 60 GHz), a very broad band transmission (for example, more than 100-Mbps bit rate) is developing. In this case, taking millimeter-wave transmission performance into account, communication between a transmit unit and a receive unit needs to be a line-of-sight communication.

However, for example, in a radio LAN system used in an office, a radio transmission path between the transmit unit and the receive unit may be interrupted by person's motion or movement of people. In this case, a communication signal is also interrupted and may not be transmitted. To prevent the above-discussed interruption to the communication signal, macrodiversity is proposed.

FIG. 1 shows a configuration example of a prior-art radio LAN system using macrodiversity. In the prior-art radio LAN system using macrodiversity, inside the office, for a single terminal station connected to at least one terminal unit, a plurality of radio base stations (for example, base stations 1 to n) are provided. A signal transmitted from a wiring LAN system is transmitted to the plurality of radio base stations through a HUB (an apparatus for branching a network) in an asynchronous transfer mode (ATM). Then, from the plurality of radio base stations, the signals are simultaneously transmitted to the terminal station on different frequencies (f1 to fn).

When the terminal station receives the signals transmitted from the plurality of radio base stations, the terminal station selects an optimum one (for example, a signal having a highest level) of the received signals, and demodulates a selected signal. In this way, by providing a plurality of transmission paths between a transmit side and a receive side, influence due to the above-discussed interruption to the transmission signal may be prevented. In this case, it is noted that to provide the radio LAN system shown in FIG. 1, for all of the transmission paths, substantially the same desired C/N (a ratio of energy of a modulated carrier signal to noise energy) ratio is required.

However, the following problem occurs in the above-discussed prior-art radio LAN system.

As previously discussed, in the radio LAN system, broad band transmission having a transmission rate of more than 100 Mbps is developing. In the prior-art radio LAN system shown in FIG. 1, to realize broad band transmission or more than 100-Mbps transmission rate, it is necessary for all of the transmission paths to achieve substantially the same desired C/N ratio at a transmission rate of more than 100 Mbps. In order to satisfy the above-discussed conditions, for all of the radio base stations, excessive transmit power is required, and antenna gain of all the radio base stations and the terminal station needs to be further increased.

Further, in the prior-art radio LAN system, a number of carriers corresponding to a number of radio base stations is required. Therefore, a broad transmission frequency band is required for the number of radio base stations, and, thus, efficient use of frequencies may be degraded.

SUMMARY OF THE INVENTION

It is an object of the present invention to provide a communication method and apparatus for a radio LAN system using a macrodiversity function. In the method and apparatus, a broad band transmission may be provided with relatively low transmit power, relatively low antenna gain, and a relatively narrower transmission frequency band. This permits the disadvantages described above to be eliminated.

The object described above is achieved by a communication method for a radio LAN system having a communication at a first transmission rate, the method comprising the steps of: (a) time-divisionally distributing a first signal of the first transmission rate into n−1 second signals (n=3, 4, . . . ); (b) respectively converting the n−1 second signals into n−1 third signals of a second transmission rate less than the first transmission rate; and (c) transmitting the n−1 third signals of the second transmission rate through radio transmission paths between n−1 radio base stations and a terminal station connected to at least one terminal unit.

The object described above is also achieved by the method mentioned above, wherein the second transmission rate is 1/(n−1) of the first transmission rate.

The object described above is also achieved by a communication apparatus for a radio LAN system which provides communication at a first transmission rate, the apparatus comprising: a rate-conversion-and-distribution circuit for time-divisionally distributing a first signal of the first transmission rate into n−1 second signals (n=3, 4, . . . ) and respectively converting the n−1 second signals into n−1 third signals of a second transmission rate less than the first transmission rate; and n−1 radio base stations transmitting the n−1 third signals of the second transmission rate to a terminal station connected to at least one terminal unit through radio transmission paths.

The object described above is also achieved by the apparatus mentioned above, wherein the second transmission rate is 1/(n−1) of the first transmission rate.

The object described above is also achieved by a terminal station used in a radio LAN system having a rate-conversion-and-distribution circuit for time-divisionally distributing a first signal of a first transmission rate into n−1 second signals (n=3, 4, . . . ) and respectively converting the n−1 second signals into n−1 third signals of a second transmission rate less than the first transmission rate, and n−1 radio base stations transmitting the n−1 third signals of the second transmission rate to the terminal station connected to at least one terminal unit through radio transmission paths, the terminal station comprising: a receiver receiving the third signals of the second transmission rate transmitted from the n−1 radio base stations; and a rate-conversion-and-multiplex circuit for converting and multiplexing received third signals of the second transmission rate into signals of the first transmission rate.

According to the above-discussed method for the radio LAN system, apparatus for the radio LAN system, and terminal station used in the radio LAN system, a fast transmission rate signal is converted to a lower transmission rate signal, and the lower transmission rate signal is transmitted through radio transmission paths from a plurality of radio base stations to the terminal station. Therefore, under the same transmit power from the radio base stations, a ratio of a modulated signal to noise (C/N) of the lower transmission rate signal may be larger than that of the fast transmission rate signal.

Namely, in order to obtain a desired C/N, using the lower transmission rate signal, the transmit power of the radio base station may be reduced, and also, antenna gain of the radio base station and the terminal station may be reduced. As a result, power consumption of the radio LAN system may be reduced. Further, a relatively simplified antenna is applicable for the radio LAN system.

The object described above is also achieved by the method mentioned above, wherein: the radio LAN system further comprises at least one redundant radio base station n; and the method further comprises the steps of: (d) transmitting a fourth signal through a radio transmission path between the terminal station and the at least one redundant radio base station n, data of the fourth signal having a given relationship with data in signals transmitted between at least k ($k \leq (n-1)$) radio base stations of the n−1 radio base stations and the terminal station; and (e) compensating, when at least one transmission path between the at least k radio base stations and the terminal station is interrupted, data of the signal to be transmitted through an interrupted transmission path based on the data of the fourth signal transmitted between the at least one redundant radio base station n and the terminal station.

The object described above is also achieved by the method mentioned above, wherein the given relationship in the step (d) is that the data of the fourth signal transmitted between the at least one redundant radio base station n and the terminal station is a summation of data of the signals transmitted between the at least k radio base stations and the terminal station for each given time slot.

The object described above is also achieved by the method mentioned above, wherein: the radio LAN system further comprises at least one redundant radio base station n; and the method further comprises the steps of: (f) monitoring interruption of transmission paths between the n−1 radio base stations and the terminal station; and (g) compensating, when one of the transmission paths is interrupted, data of an interrupted transmission path by transmitting the data of the interrupted transmission path between the at least one redundant radio base station n and the terminal station.

The object described above is also achieved by the apparatus mentioned above, further comprising: at least one summation circuit for generating a fourth signal by summing data of at least k ($k \leq (n-1)$) signals of the n−1 third signals of the second transmission rate for every timeslot; and at least one redundant radio base station n transmitting the fourth signal generated in the at least one summation circuit to the terminal station.

The object described above is also achieved by the apparatus mentioned above, further comprising: at least one redundant radio base station n transmitting a signal to the terminal station; a line monitoring circuit for monitoring interruption of transmission paths between the n−1 radio base stations and the terminal station; and a switching circuit, when at least one of the transmission paths is interrupted, for forwarding a signal to be transmitted through an interrupted transmission path to the at least one redundant radio base station n.

The object described above is also achieved by a terminal station used in a radio LAN system having a rate-conversion-and-distribution circuit for time-divisionally distributing a first signal of a first transmission rate into n−1 second signals (n=3, 4, . . . ) and respectively converting the n−1 second signals into n−1 third signals of a second transmission rate less than the first transmission rate, n−1 radio base stations transmitting the n−1 third signals of the second transmission rate to the terminal station connected to at least one terminal unit through radio transmission paths, at least one first summation circuit for generating a fourth signal by summing data of at least k ($k \leq (n-1)$) signals of the n−1 third signals of the second transmission rate for every timeslot, and at least one redundant radio base station n transmitting the fourth signal generated in the at least one first summation circuit to the terminal station, the terminal station comprising: a receiver receiving the third signals of the second transmission rate transmitted from the n−1 radio base stations; a rate-conversion-and-multiplex circuit for converting and multiplexing received third signals of the second transmission rate into signals of the first transmission rate; a line monitoring circuit for monitoring interruption of transmission paths between the n−1 radio base stations and the terminal station; at least one second summation circuit, when at least one of the transmission paths is interrupted, for generating a fifth signal by summing every timeslot data of at least k signals of signals transmitted from the n−1 radio base stations except for a signal to be transmitted through an interrupted transmission path; at least one subtraction circuit for generating subtraction data between data of the signal transmitted from the redundant radio base station n and data of the fifth signal generated in the second summation circuit; and a switching circuit for providing the subtraction data generated in the subtraction circuit to the rate-conversion-and-multiplex circuit instead of providing data of an interrupted signal detected in the monitoring circuit; wherein even if at least one of signals transmitted from the n−1 radio base stations is interrupted, data of the interrupted signal is compensated.

The object described above is also achieved by a terminal station used in a radio LAN system having a rate-conversion-and-distribution circuit for time-divisionally distributing a first signal of a first transmission rate into n−1 second signals (n=3, 4, . . . ) and respectively converting the n−1 second signals into n−1 third signals of a second transmission rate less than the first transmission rate, n−1 radio base stations transmitting the n−1 third signals of the second transmission rate to the terminal station connected to at least one terminal unit through radio transmission paths, at least one redundant radio base station n transmitting a signal to the terminal station, a first line monitoring circuit for monitoring interruption of transmission paths between the n−1 radio base stations and the terminal station and a first switching circuit when at least one of the transmission paths is interrupted, for forwarding a signal to be transmitted through an interrupted transmission path to the at least one redundant radio base station n; the terminal station comprising: a receiver receiving the third signals of the second transmission rate transmitted from the n−1 radio base stations; a rate-conversion-and-multiplex circuit for converting and multiplexing received third signals of the second transmission rate into signals of the first transmission rate; a second line monitoring circuit for monitoring interruption of transmission paths between the n−1 radio base stations and the terminal station; and a second switching circuit, when at least one of the transmission paths is interrupted, for providing the signal transmitted from the redundant radio base station to the rate-conversion-and-multiplex circuit instead of providing a signal to be transmitted through an interrupted transmission path; wherein even if at least one of signals transmitted from the n−1 radio base stations is interrupted, data of the interrupted signal is compensated.

According to the above-discussed method for the radio LAN system, the apparatus for the radio LAN system, and the terminal station used in the radio LAN system, in order to establish a fast data communication, the lower transmission rate data is transmitted through a plurality of radio transmission paths. Further, an additional redundant radio transmission path is provided, and the data in the interrupted transmission path is compensated.

Therefore, the transmit power and the antenna gain in the radio LAN system may be reduced, and also, a compensating function of the data of the interrupted transmission path may be obtained. As a result, a higher-rate-(broad band) data-transmission radio LAN system may be realized.

Further, since a required frequency band for transmission between the respective radio base stations and the terminal station may be reduced, even if taking a frequency band required for the redundant radio base station into account, usage frequency band for the radio LAN system may be significantly reduced.

Particularly, in the above-discussed specified system, the signal to be transmitted through the interrupted transmission path may be flexibly allocated to the redundant radio transmission path. Therefore, even when the transmission paths, a number thereof being the same as a number of the redundant radio transmission paths, are interrupted, signal data of the interrupted transmission paths may be efficiently compensated.

Other objects and further features of the present invention will be apparent from the following detailed description when read in conjunction with the accompanying drawings.

BRIEF DESCRIPTION OF THE DRAWINGS

FIG. 4 shows an illustration for explaining a relationship between signal data for radio base stations 1 to 3 and signal data for a redundant radio base station n, the signal data for the radio base stations 1 to n being provided in the signals C shown in FIG. 3;

DETAILED DESCRIPTION OF THE PREFERRED EMBODIMENTS

Figure 1:
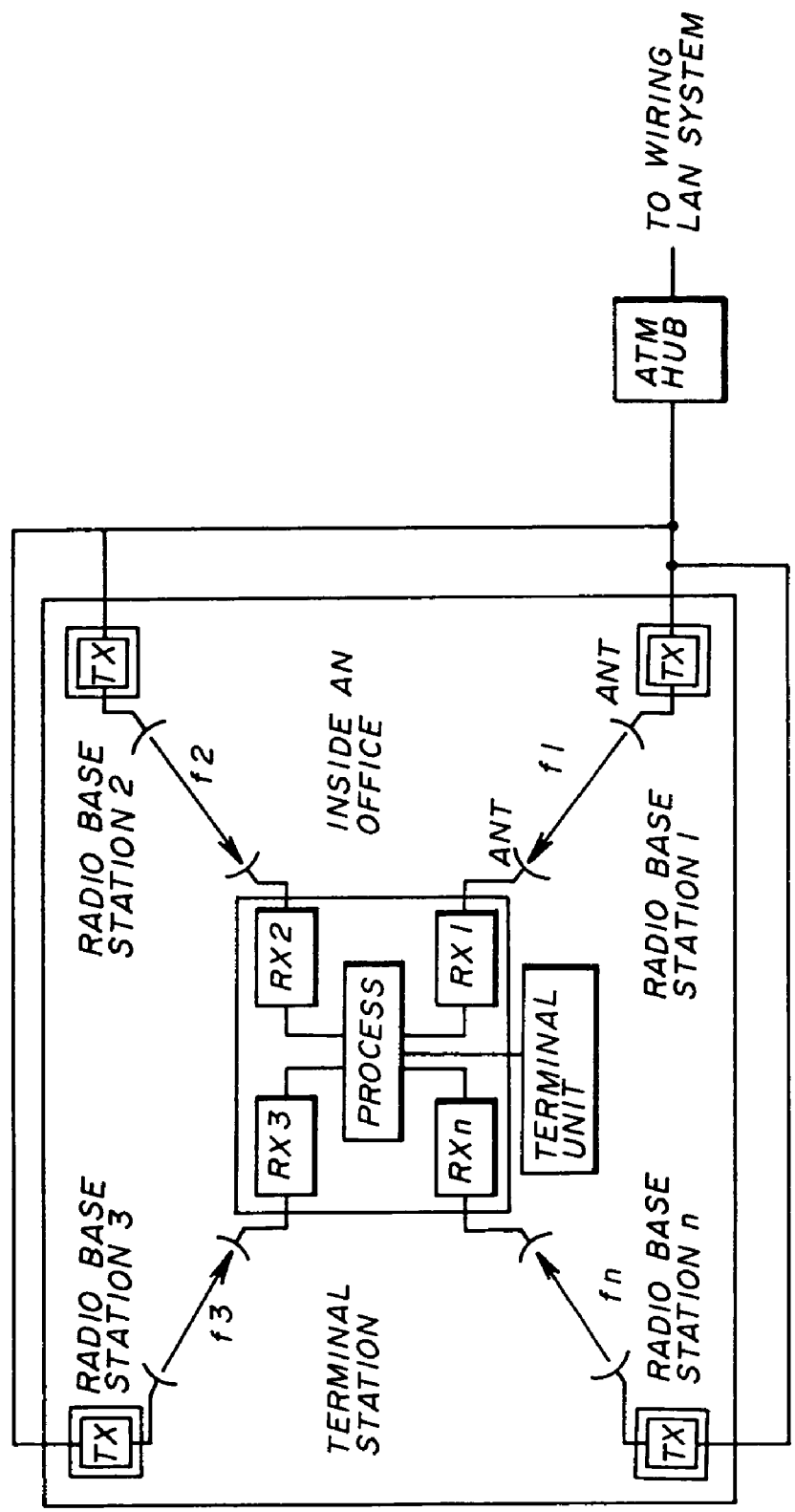
FIG. 1 shows a configuration example of a prior-art radio local area network (LAN) system using a macrodiversity.
Figure 2:
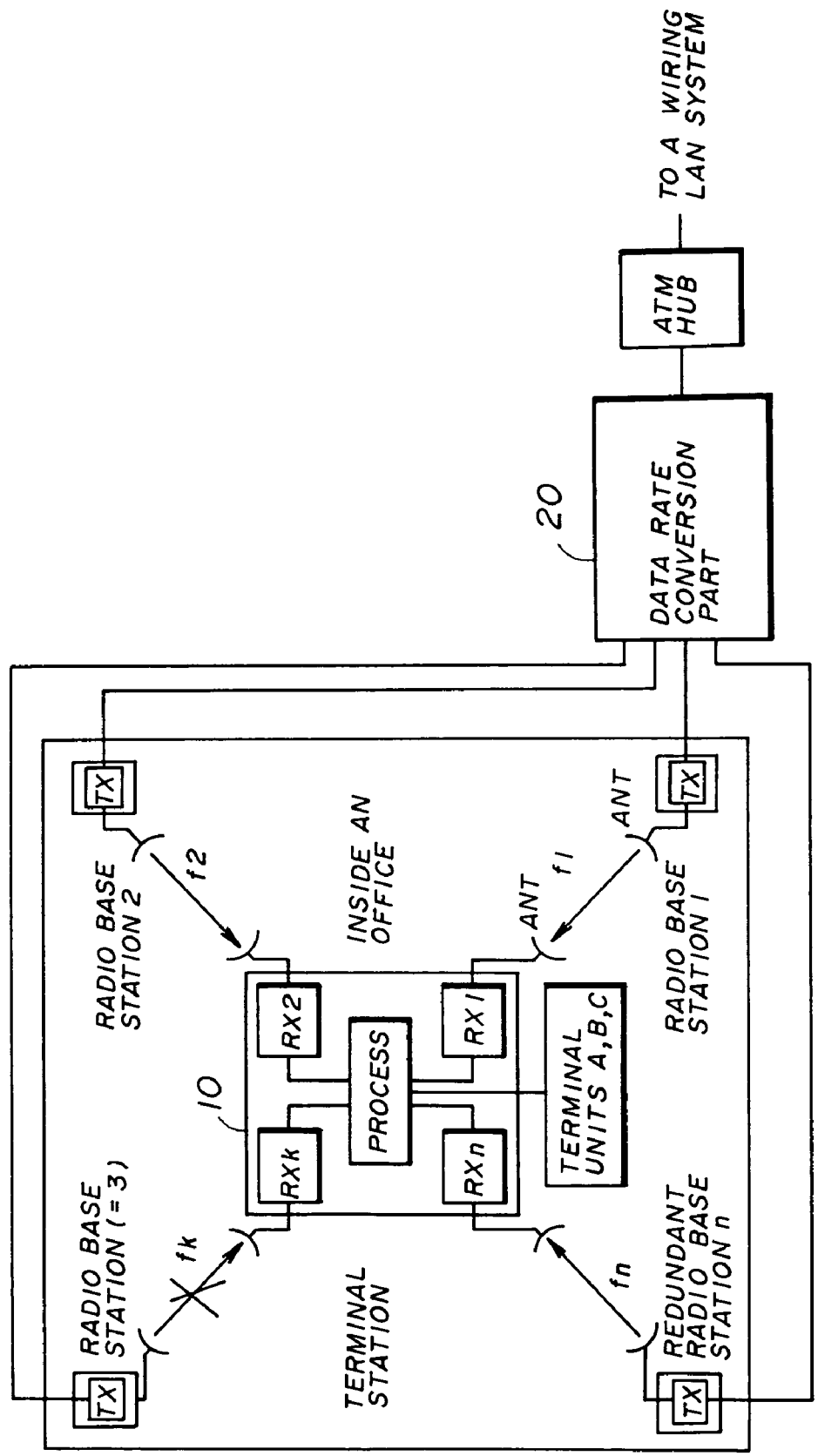
FIG. 2 shows a block diagram of a first embodiment of a radio LAN system according to the present invention.
Figure 3:
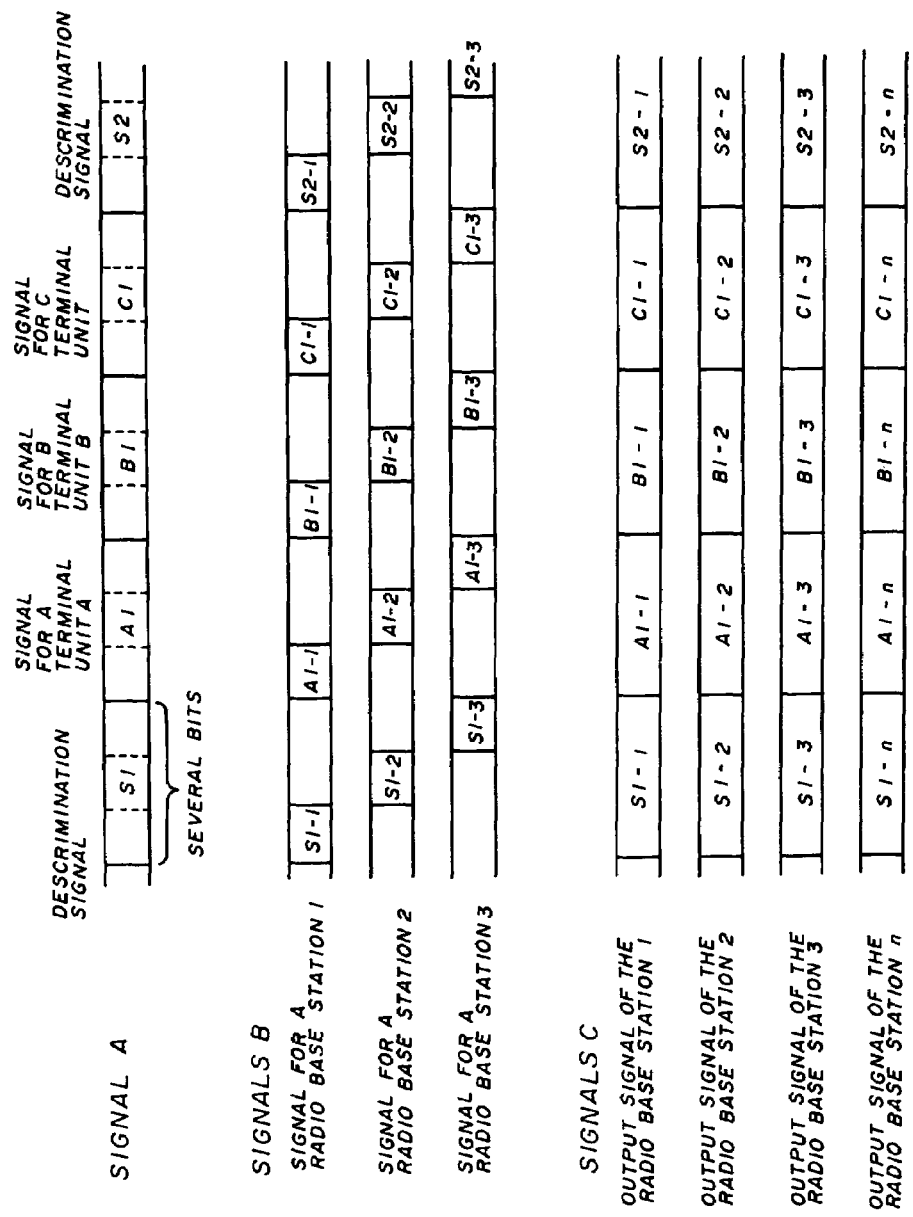
FIG. 3 shows illustrations for explaining an operation of a data-rate conversion part shown in FIG. 2. A signal A indicates an input signal, signals B indicate temporally divided signals, and signals C indicate output signals for respective radio base stations after rate conversion.

First, a description will be given of a first embodiment of a radio LAN system according to the present invention, by referring to FIG. 2 to FIG. 6. FIG. 2 shows a block diagram of the first embodiment of the radio LAN system according to the present invention. FIG. 3 shows illustrations for explaining an operation of a data-rate conversion part shown in FIG. 2. A signal A indicates an input signal, signals B indicate temporally divided signals, and signals C indicate output signals for respective radio base stations after rate conversion.

Figure 5:
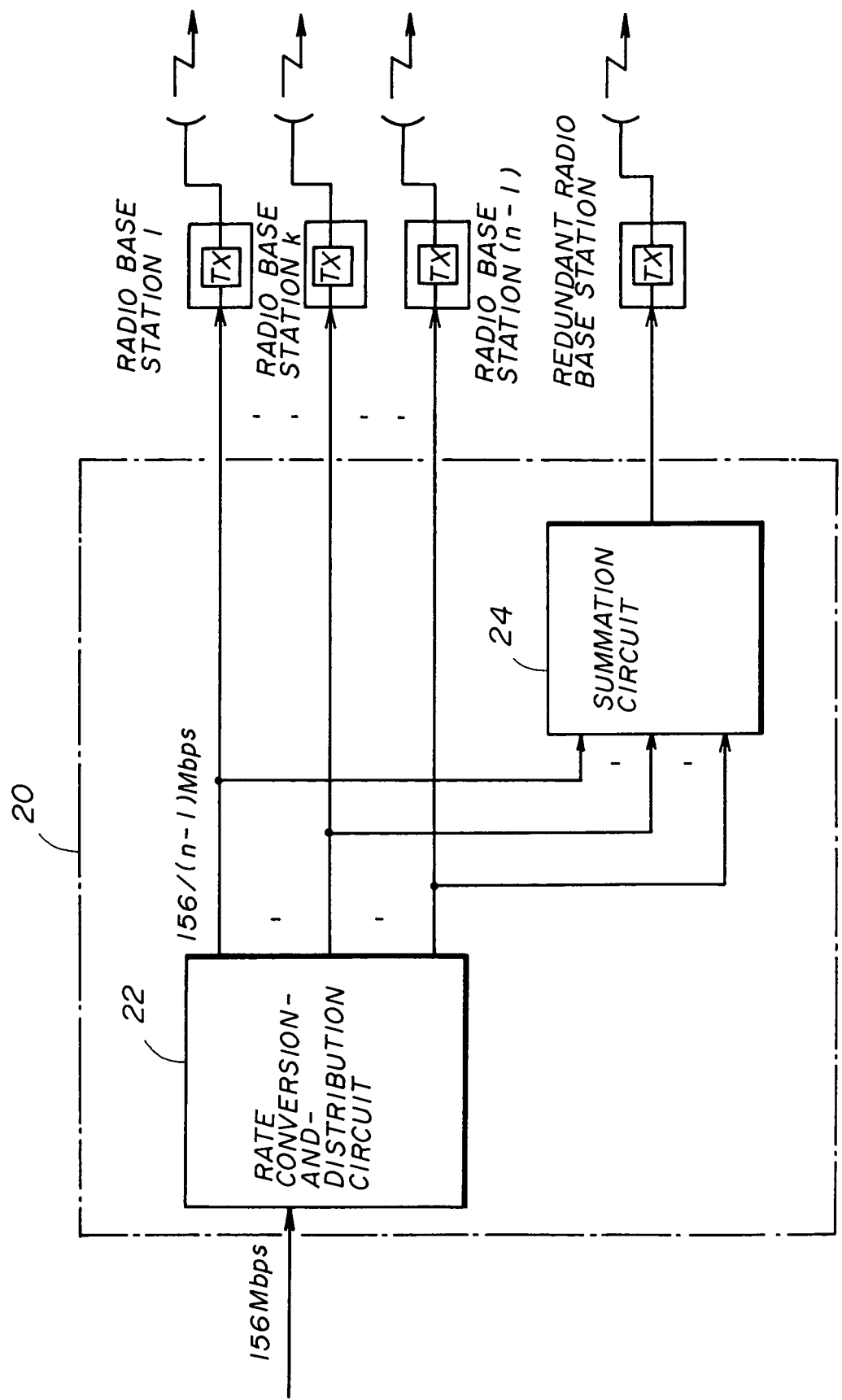
FIG. 5 shows a configuration example of the data-rate conversion part and the radio base stations shown in FIG. 2.
Figure 6:
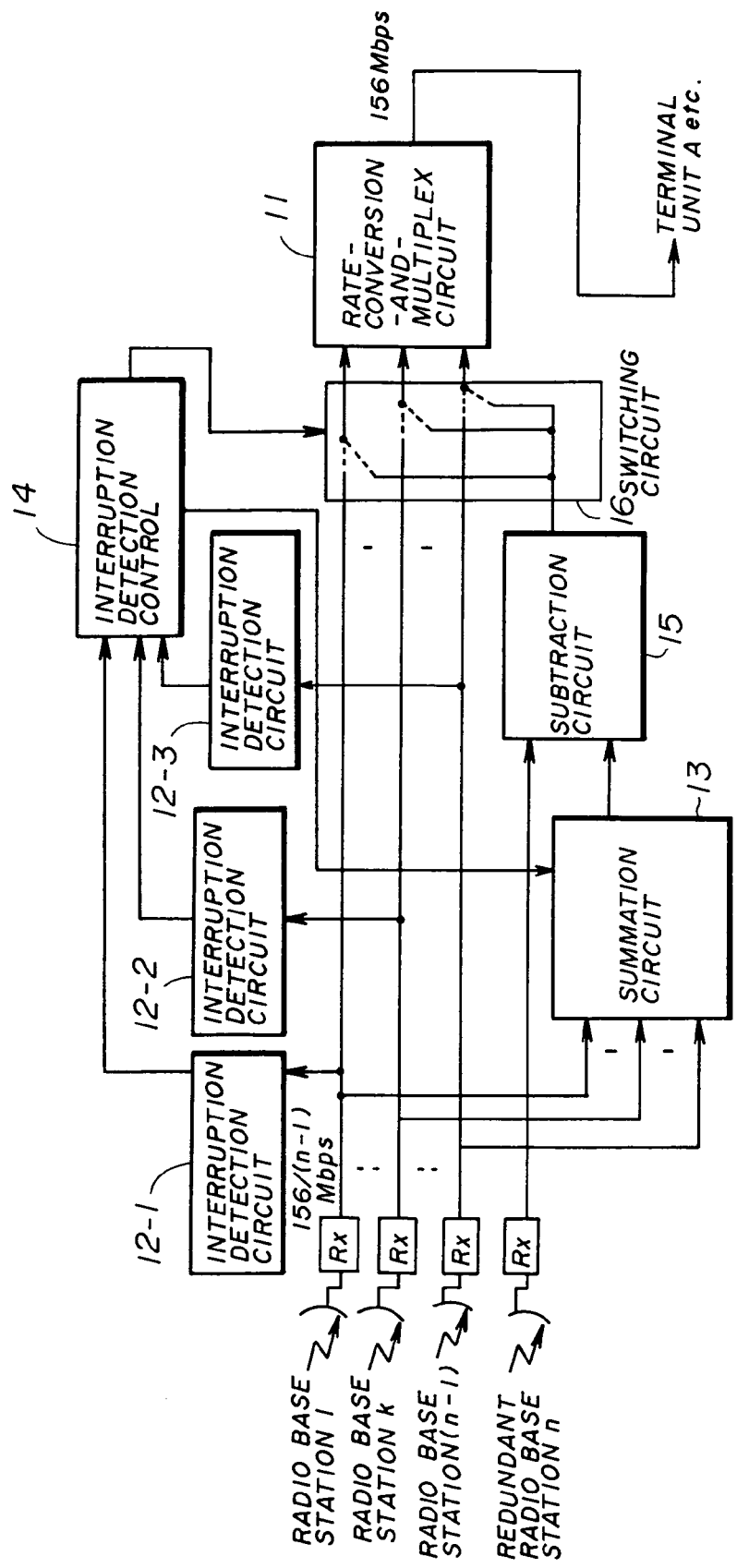
FIG. 6 shows a configuration example of a terminal station shown in FIG. 2.

FIG. 4 shows an illustration for explaining a relationship between signal data for radio base stations 1 to 3 and signal data for a redundant radio base station n, the signal data for the radio base stations 1 to n being provided in the signals C shown in FIG. 3. FIG. 5 shows a configuration example of the data-rate conversion part and the radio base stations shown in FIG. 2. FIG. 6 shows a configuration example of a terminal station shown in FIG. 2.

In the radio LAN system according to the present invention shown in FIG. 2, inside an office, for a single terminal station 10 connected to at least one terminal unit, a plurality of radio base stations (in this case, a radio base station 1, a radio base station 2, a radio base station k (=3), and a radio base station n are provided.

In the first embodiment shown in FIG. 2, the radio base station n is used for the redundant radio base station (discussed in detail later). A signal transmitted from an external wiring LAN system is provided to a data-rate conversion part 20 through a HUB in an ATM. This input signal is represented by the signal A shown in FIG. 3. The input signal contains a signal for a terminal unit A, a signal for a terminal unit B, and a signal for a terminal unit C in addition to a discrimination signal.

Different cases can exist in a connecting relation between the terminal station 10 and the terminal units A to C. For example, in one case, for each terminal station, the terminal unit is provided. In another case, a plurality of terminal units belong to a single terminal station. In either cases, by an address provided for each data, each data may be properly transmitted to an addressed terminal unit.

In the data-rate conversion part 20, as shown in the signals B in FIG. 3, the discrimination signal and the respective terminal-unit signals contained in the input signal A are time-divisionally divided into three signals for the radio base stations 1 to k (in the embodiment, k=3) for each of the timeslots.

Further, as shown in the upper three signals of the signals C in FIG. 3, respective rates of the three divided signals are converted to three lower-rate signals. In this embodiment, the converted rate is one-third of the input-signal data rate. Namely, in general, the input-signal data rate is converted to one divided by the number of radio base stations n−1 (in this case, k=n−1).

Also, as shown in the bottom signal of the signals C in FIG. 3, for the redundant radio base station n, specified data which has a given relationship with the data of the divided three signals is generated. For example, as shown in FIG. 4, the signal data for the redundant radio base station n may be set as a summation of the three signal data for the radio base stations 1 to k.

The above-discussed operation may be carried out by the configuration example of the data-rate conversion part 20 shown in FIG. 5. In a rate-conversion-and-distribution circuit 22 of the data-rate conversion part 20 shown in FIG. 5, the input signal shown in the signal A of FIG. 3 is converted to the upper three signal data of the signals C in FIG. 3. Subsequently, in a summation circuit 24, the three signal data for the radio base stations 1 to k are summed with each other to produce the signal data for the redundant radio base station n. In FIG. 5, for example, when a 156-Mbps transmission signal is provided from the wiring LAN system through the ATM-HUB, three 52-Mbps (=156 Mbps/3) transmission signals are transmitted to the radio base stations 1 to 3 and the redundant radio base station n.

Next, the four lower-rate-converted signals shown in the signals C of FIG. 3 are respectively transmitted to the terminal station 10. The terminal station 10 receives the above-discussed four signals through antennas and receivers corresponding to the four radio base stations.

As shown in FIG. 6, the terminal station 10 has a rate-conversion-and-multiplex circuit 11 which converts the transmission rate (in this case, 52 Mbps) of the three signals transmitted from the radio base stations 1 to 3 and multiplexes them to reproduce an original fast rate signal (shown in the signal A of FIG. 3, 156 Mbps). The reproduced 156-Mbps signal contains the signal for the terminal unit A, the signal for the terminal unit B, and the signal for the terminal unit C. If only the terminal unit A is connected to the terminal station 10, only the signal for the terminal unit A is provided to the terminal unit A from the reproduced 156-Mbps signal.

As discussed above, in the radio LAN system according to the present invention, the fast-rate transmission signal transmitted from the wiring LAN system is converted to the lower-rate transmission signal, and is transmitted from the plurality of radio base stations to the terminal station 10. Therefore, under the same transmit power, a ratio of the modulated signal to noise (C/N ratio) in the lower-rate transmission signal becomes large as compared to that in the fast-rate transmission signal. Namely, in order to obtain the desired C/N ratio, in a case of the lower-rate transmission signal, the transmit power of the radio base station may be reduced, and the antenna gains of the radio base stations and the terminal station may also be reduced. Therefore, power consumption of the radio LAN system may be reduced, and a relatively simplified antenna is usable for the radio LAN system.

Next, a description will be given of an operation of the radio LAN system according to the present invention when one of the three transmission paths between the radio base stations 1 to 3 and the terminal station 10 is interrupted. In the following, for example, as shown in FIG. 2, a case where the transmission path between the radio base station 3 and the terminal station 10 is interrupted will be shown.

In the terminal station 10 shown in FIG. 6, the three signals transmitted from the radio base stations 1 to 3 are respectively monitored by interruption detection circuits 12-1, 12-2, 12-3, and which transmission path has been interrupted may be determined by an interruption detection control circuit 14. The interruption detection circuits 12-1, 12-2, 12-3 may be easily constructed with, for example, an RF level detector, etc.

Further, in FIG. 6, in the same way as the summation circuit 24 in the data-rate conversion part 20 shown in FIG. 5, the three signals from the radio base stations 1 to 3 are summed for each given timeslot in a summation circuit 13. In this case, when signal data transmitted from the interrupted transmission path is substantially random data due to noise, the interruption detection control circuit 14 controls the signal data transmitted from the interrupted transmission path not to be added to the summation or to be all zero.

Therefore, in a subtraction circuit 15, when summed data from the summation circuit 13 is subtracted from the signal data transmitted from the redundant radio base station n, the subtraction circuit 15 may produce correct original signal data on the interrupted transmission path. Further, the interruption detection control circuit 14 controls a switching circuit 16 to insert the correct original signal data from the subtraction circuit 15 into the interrupted transmission path.

The above-discussed operation may be commonly represented by the following equation.

data $k$=data $n$−{data 1+ . . . data($k$−1)+data($k$+1)+ . . . data($n$−1)}, where data i indicates data transmitted from a radio base station i to the terminal station 10.

By the above-discussed operation, the signal data lost due to interruption of the transmission path may be compensated. In the prior-art radio LAN system using macrodiversity, fast-rate data is transmitted to the terminal station through a plurality of radio transmission paths, the signal data lost due to interruption of the transmission path is intended to be compensated by signal data transmitted through another transmission path.

On the contrary, in the radio LAN system according to the present invention, in order to carry out a data communication at the same fast-rate transmission, the lower-rate data is transmitted to the terminal station through a plurality of transmission paths, and also, an additional redundant transmission path is provided. As a result, the lost data in the interrupted transmission path may be positively compensated.

Therefore, as discussed previously, the transmit power and the antenna gain may be reduced, and data compensation function in the interrupted transmission path may be positively obtained. As a result, the radio LAN system with higher-rate (broad band) data transmission may be realized.

In the above-discussed radio LAN system according to the present invention, the given relationship described in the data-rate conversion part 20 shown in FIG. 2 is not limited to a summation operation. Namely, when the transmission path is interrupted, lost data in the interrupted transmission path may be determined from the other signal data by any operation, the operation is applicable for the data-rate conversion part 20.

Figure 7:
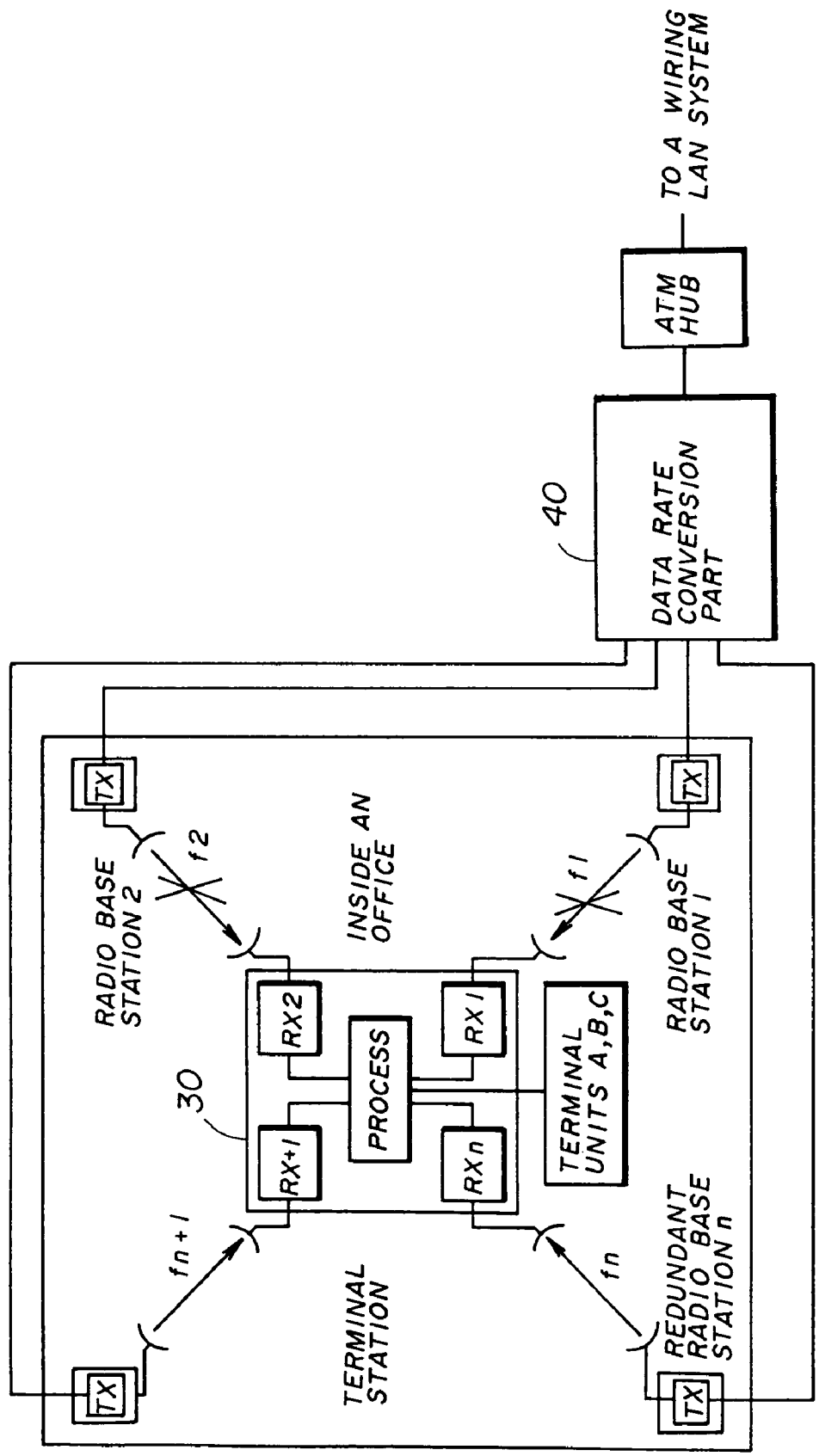
FIG. 7 shows a block diagram of a second embodiment of the radio LAN system according to the present invention.
Figure 8:
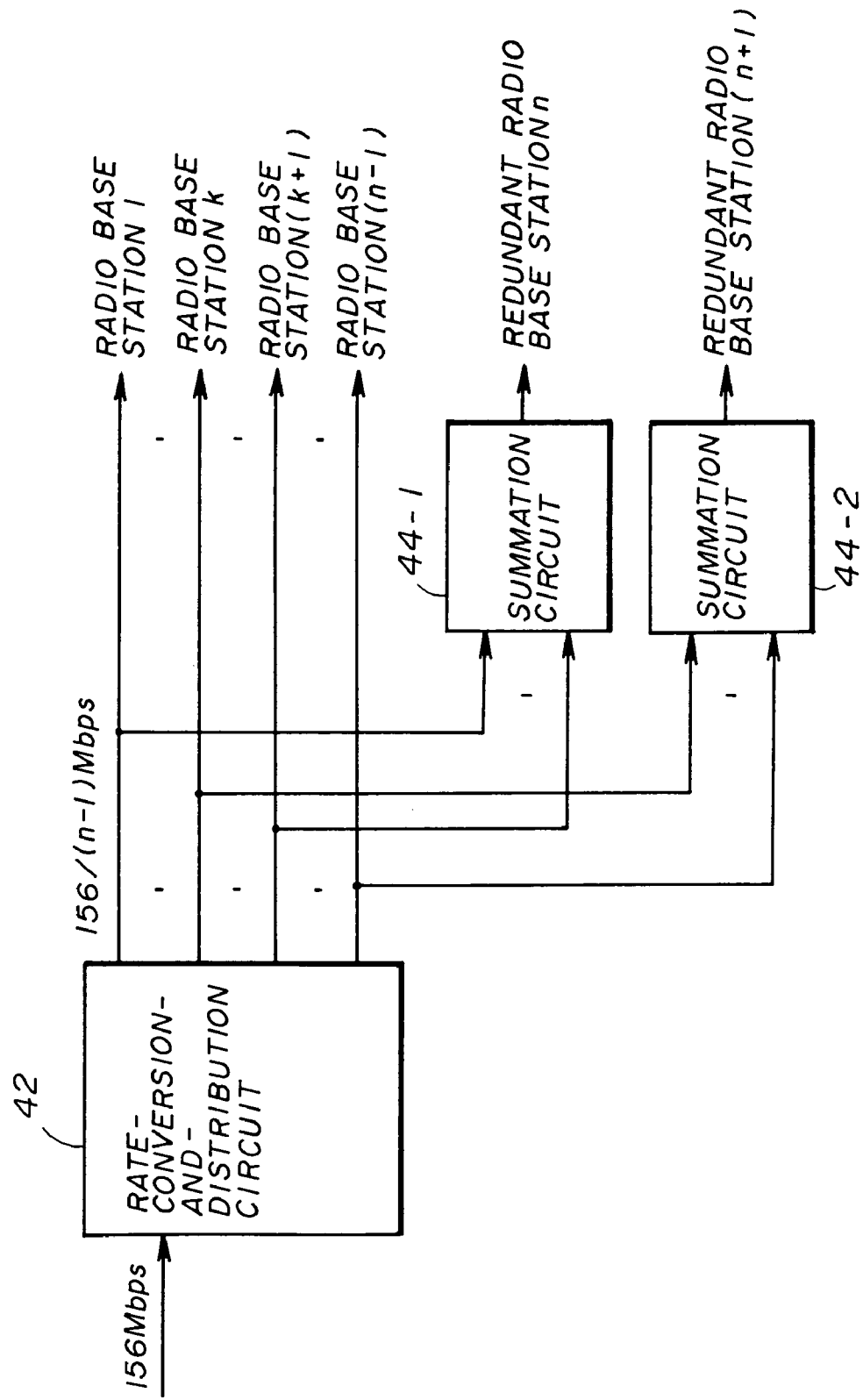
FIG. 8 shows a configuration example of a data-rate conversion part and radio base stations shown in FIG. 7.
Figure 9:
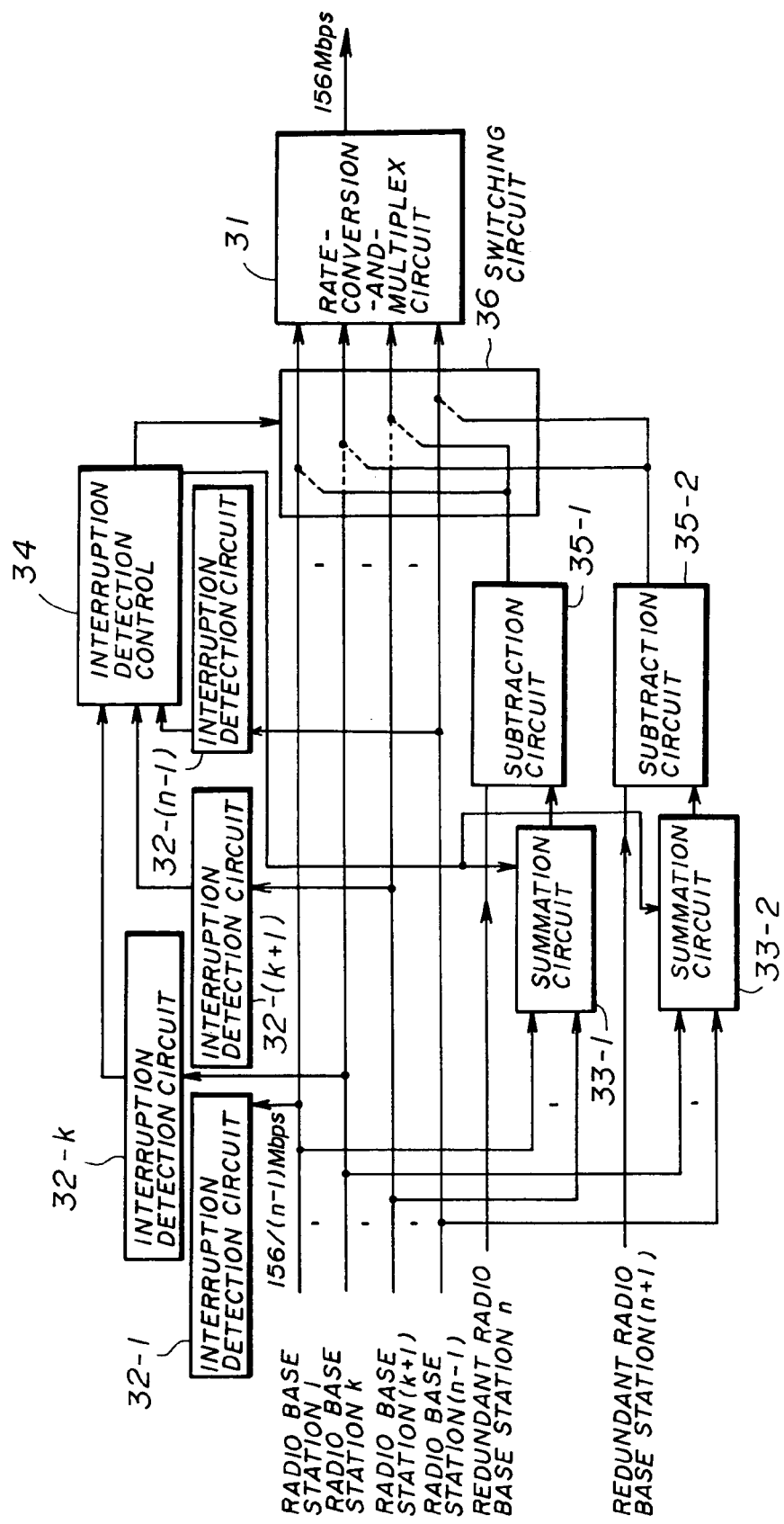
FIG. 9 shows a configuration example of a terminal station shown in FIG. 7.

Next, a description will be given of a second embodiment of the radio LAN system according to the present invention, by referring to FIG. 7 to FIG. 9. FIG. 7 shows a block diagram of the second embodiment of the radio LAN system according to the present invention. FIG. 8 shows a configuration example of a data-rate conversion part and radio base stations shown in FIG. 7. FIG. 9 shows a configuration example of a terminal station shown in FIG. 7.

The second embodiment of the radio LAN system shown in FIG. 7 has substantially the same operation as that of the first embodiment of the radio LAN system shown in FIG. 2. In the radio LAN system shown in FIG. 7, in addition to a plurality of conventional radio base stations 1 to n−1 (in an example of FIG. 7, to simplify the description, only the radio base stations 1, 2 are shown), a plurality of redundant radio base stations (radio base stations n, n+1, in FIG. 7) are provided.

Namely, in the second embodiment shown in FIG. 7, in the same way as the data-rate conversion part 20 shown in FIG. 2, in a data-rate conversion part 40, the signal (for example, 156 Mbps) transmitted from the wiring LAN system through the ATM-HUB is distributed into (n−1) signals corresponding to the radio base stations 1 to n−1. Further, the distributed signals are converted to lower-rate signals (for example, 156/(n−1) Mbps). The above-discussed operation is carried out in a rate-conversion-and-distribution circuit 42 shown in FIG. 8.

Further, in the data-rate conversion part 40 shown in FIG. 8, the signals for the (n−1) conventional radio base stations are distributed into two groups of signals (for example, odd-number radio base stations and even-number radio base stations). In summation circuits 44-1, 44-2, the two groups of signals are respectively summed for each given timeslot to generate two signals for the redundant radio base station n and the redundant radio base station n+1.

The rate-converted signals produced from the data-rate conversion part 40 are respectively transmitted to the terminal station 30 on the lower frequency band through the radio base stations 1 to n+1.

In the terminal station 30 shown in FIG. 9, signals received from the radio base stations 1 to n−1 are provided to a rate-conversion-and-multiplex circuit 31. The rate-conversion-and-multiplex circuit 31 converts the received signals into original-fast-rate (156 Mbps) signals, and multiplexes the received signals to reproduce an original signal transmitted from the wiring LAN system.

In the same way as the terminal station 10 shown in FIG. 6, the terminal station 30 has interruption detection circuits 32-1 to 32-(n−1) on transmission paths for the radio base stations 1 to n−1 and an interruption detection control circuit 34 connected to the interruption detection circuits 32-1 to 32-(n−1). The interruption detection control circuit 34 may detect which transmission path has been interrupted.

Further, in FIG. 9, in the same way as the data-rate conversion part 40, signals transmitted from the radio base stations 1 to n−1 are distributed into two groups of signals (in this case, signals from the odd-number radio base stations, and signals from the even-number radio base stations). In summation circuits 33-1, 33-2, the two groups of signals are respectively summed for each given timeslot.

At this time, when a certain transmission path is interrupted, since the signal data transmitted from the interrupted transmission path is substantially random data due to noise, the interruption detection control circuit 34 controls the signal data transmitted from the interrupted transmission path not to be added to the summation or to be all zero.

Further, in subtraction circuits 35-1, 35-2, when summed data from the summation circuits 33-1, 33-2 is respectively subtracted from the signal data transmitted from the redundant radio base stations n and n+1, one of the subtraction circuits 35-1, 35-2 may produce correct original signal data of the interrupted transmission path. Further, the interruption detection control circuit 34 controls a switching circuit 34 to insert the correct original signal data from one of the subtraction circuits 35-1, 35-2 into the interrupted transmission path.

Namely when the transmission path for the odd-number radio base station is interrupted, the correct signal data is inserted by the subtraction circuit 35-1, and when the transmission path for the even-number radio base station is interrupted, the correct signal data is inserted by the subtraction circuit 35-2.

According to the above-discussed radio LAN system, in the same way as the radio LAN system shown in FIG. 2, an advantage by the lower-rate radio transmission is provided. Further, even when two transmission paths (in the different groups) are simultaneously interrupted, the signal data of the interrupted transmission paths may be positively compensated.

In the radio LAN system shown in FIG. 7, the transmission paths between the radio base stations and the terminal station 30 are distributed into the two groups of signals, and the two redundant radio base stations are provided. However, by providing an additional number of groups of transmission paths and an additional number of redundant radio base stations, compensating performance for the interrupted data may be improved.

Figure 10:
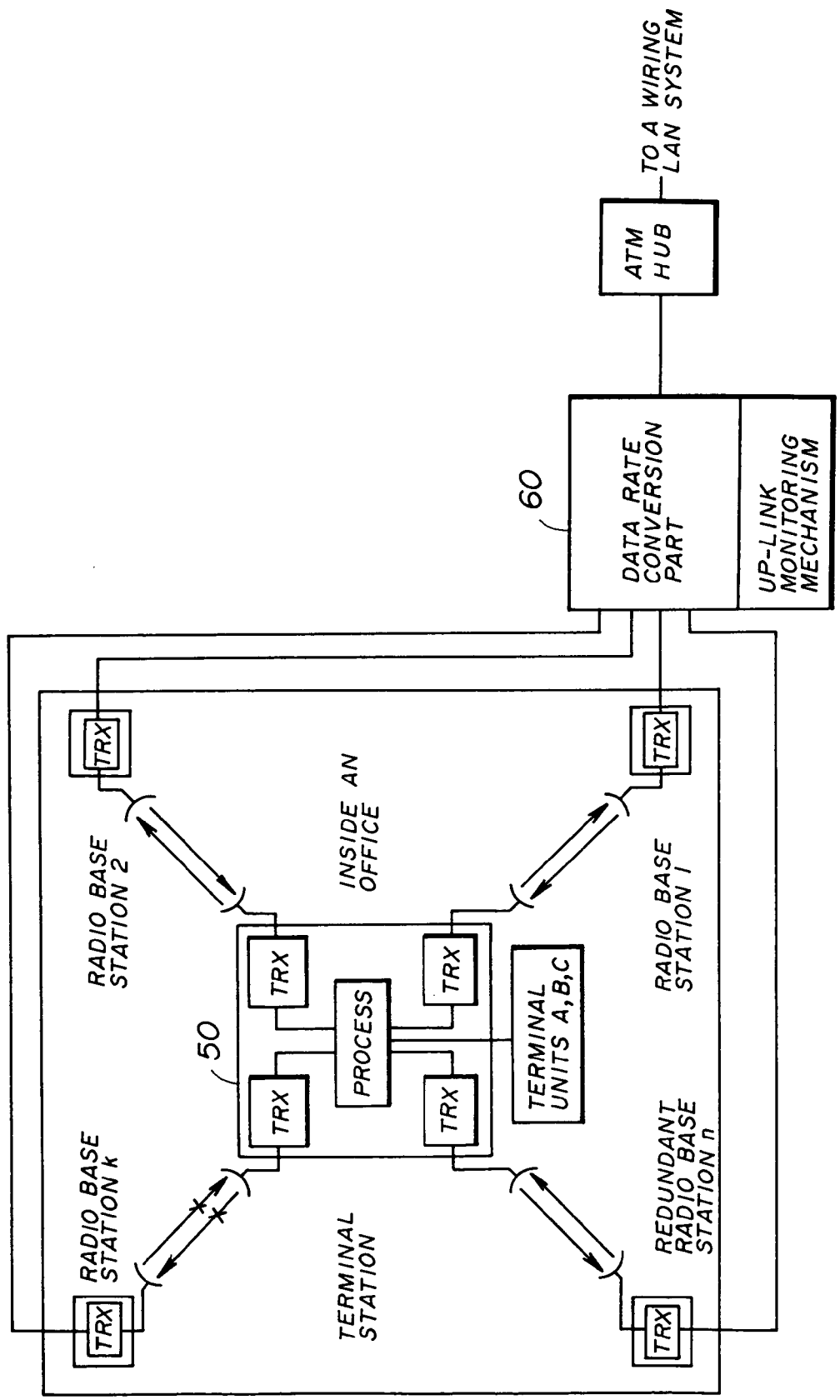
FIG. 10 shows a block diagram of a third embodiment of the radio LAN system according to the present invention.
Figure 11:
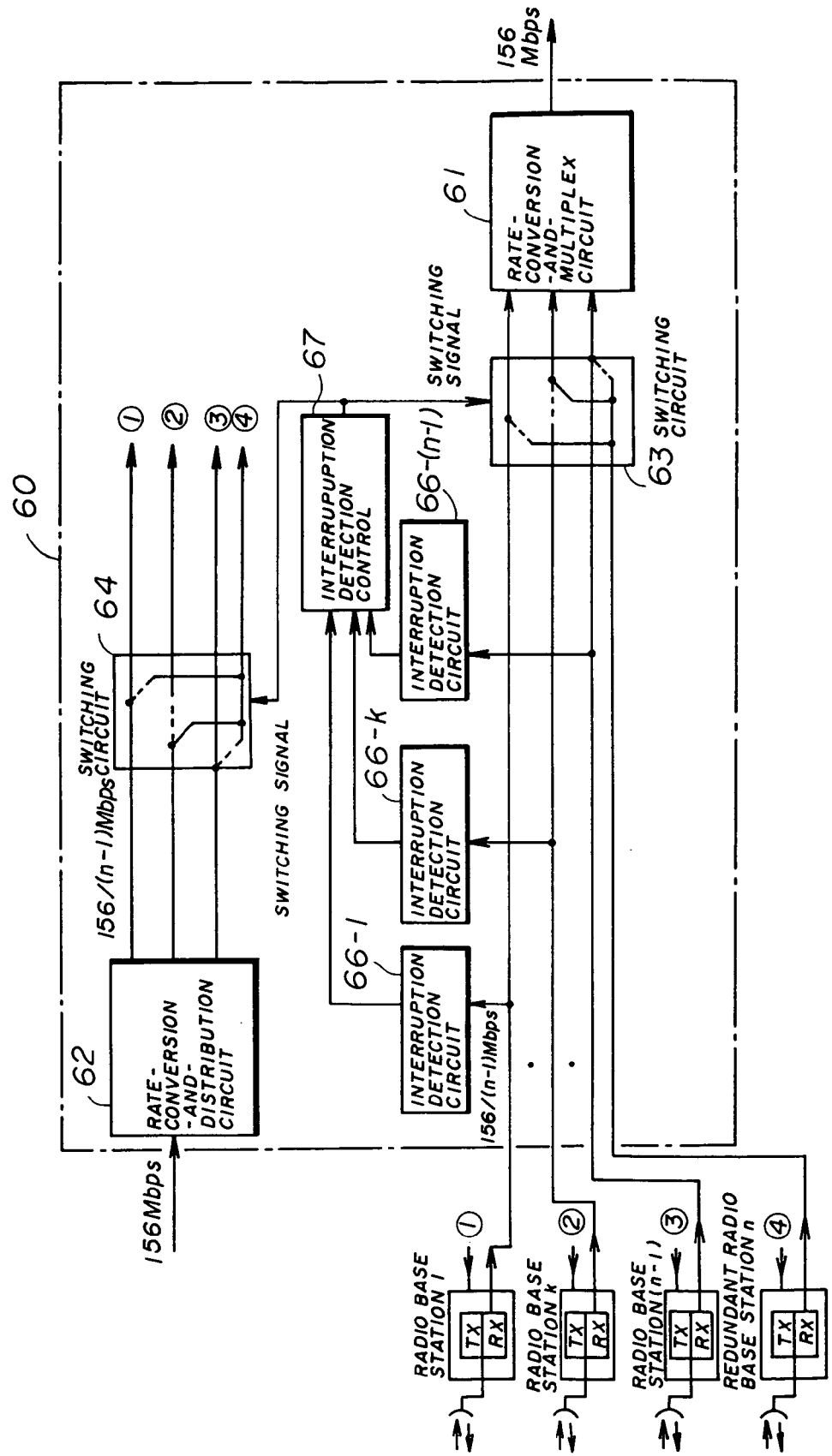
FIG. 11 shows a configuration example of a data-rate conversion part and radio base stations shown in FIG. 10.

Next, a description will be given of a third embodiment of the radio LAN system according to the present invention, by referring to FIG. 10 and FIG. 11. FIG. 10 shows a block diagram of the third embodiment of the radio LAN system according to the present invention. FIG. 11 shows a configuration example of a data-rate conversion part and radio base stations shown in FIG. 10. A terminal station 50 shown in FIG. 10 has substantially the same configuration as that of the data-rate conversion part and the radio base stations shown in FIG. 11.

In the radio LAN system according to the present invention shown in FIG. 10, inside the office, for the single terminal station 50 connected to at least one terminal unit, a plurality of radio base stations (in this case, radio base stations 1 to n) are provided. In the third embodiment shown in FIG. 10, the radio base station n is used for the redundant radio base station. Further, between the respective radio base stations and the terminal station 50, two-way communications are established. Therefore, as shown in FIG. 11, in each radio base station (including a data-rate conversion part 60) and the terminal station 50, a transmitter, the rate-conversion-and-distribution circuit, and the rate-conversion-and-multiplex circuit are respectively provided.

Further, because of the two-way communication, by monitoring an up-link transmission path from the terminal station 50 to the radio base station, the radio base station also may monitor whether the transmission path is interrupted (referred to as an interruption state). Therefore, as shown in FIG. 10 and FIG. 11, in the data-rate conversion part 60, an up-link monitoring mechanism comprising interruption detection circuits 66-1 to 66-(n−1) and an interruption detection control circuit 67 is provided.

In the following, a description will be given of an operation of the radio LAN system shown in FIG. 10.

The signal transmitted from the external wiring LAN system is provided to the data-rate conversion part 60 through the ATM-HUB. In the same way as the first embodiment of the radio LAN system shown in FIG. 2, the input signal is distributed into a plurality of signals, each having a 1/(n−1) of the input-signal's transmission rate. Distributed signals are transmitted of the terminal station 50 through the radio base stations 1 to n−1.

In this case, to the signal for the redundant radio base station n, one of the signals for the radio base stations 1 to n−1 may be allocated by a switching circuit 64.

In the terminal station 50, in the same operation as that of the radio LAN system shown in FIG. 2, received signals from the radio base stations 1 to n−1 are provided to a rate-conversion-and-multiplex circuit 61 to be converted and multiplexed into an original fast-rate (156 Mbps) signal. As a result, an original signal which has been transmitted from the wiring LAN system is reproduced.

In the same way, because of the two-way communication, the lower-rate signals which are converted and distributed in the terminal station 50 are transmitted to the respective radio base stations 1 to n−1, and are converted and multiplexed to the original fast-rate signal in the rate-conversion-and-multiplex circuit 61 of the data-rate conversion part 60 to reproduce the signal to be transmitted to the wiring LAN system.

As shown in FIG. 10, when the transmission paths between the radio base station k and the terminal station 50 is interrupted, the interrupted transmission path is detected by the up-link monitoring mechanism in the data-rate conversion part 60. Subsequently, by the switching circuit 64, the signal data in the interrupted transmission path (data from the radio base station k) is transmitted to the redundant radio base station n, and is transmitted to the terminal station 50.

In the terminal station 50, a down-link monitoring mechanism having the same configuration as that of the up-link monitoring mechanism is provided. Therefore, the terminal station 50 also detects the interrupted transmission path. Accordingly, by a switching circuit (corresponding to the switching circuit 63 in the data-rate conversion part 60), the data transmitted from the radio base station n is used instead of the data from the radio base station k.

In the above-discussed operation, by using the down-link monitoring mechanism in the terminal station 50, the terminal station 50 may detect the interrupted transmission path. However, also by providing information of an output result (the interrupted transmission path) of the up-link monitoring mechanism into the data transmitted from the radio base station n to the terminal station 50, the terminal station 50 may detect the interrupted transmission path from that information in order to control the switching circuit.

Figure 12:
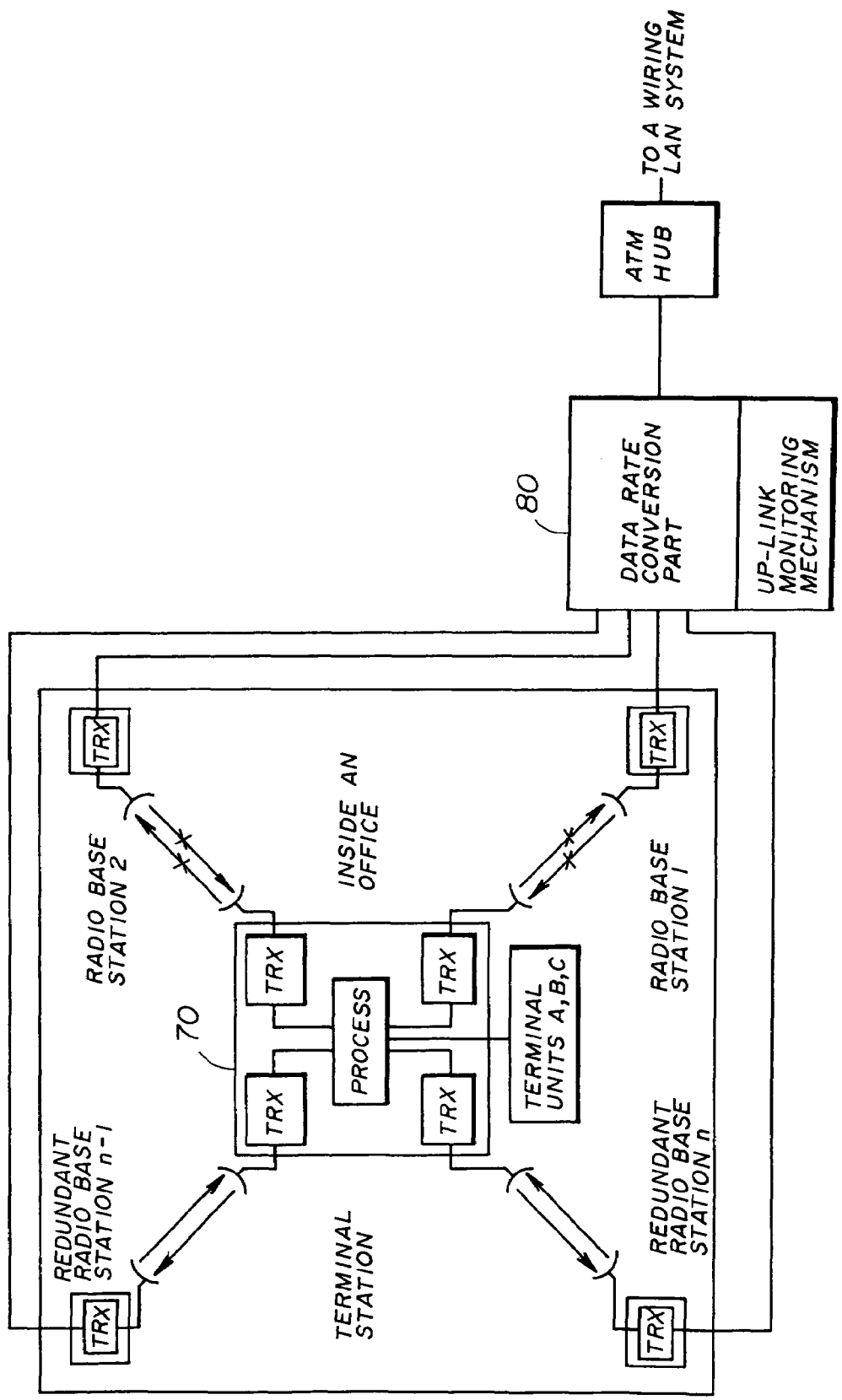
FIG. 12 shows a block diagram of a fourth embodiment of the radio LAN system according to the present invention.
Figure 13:
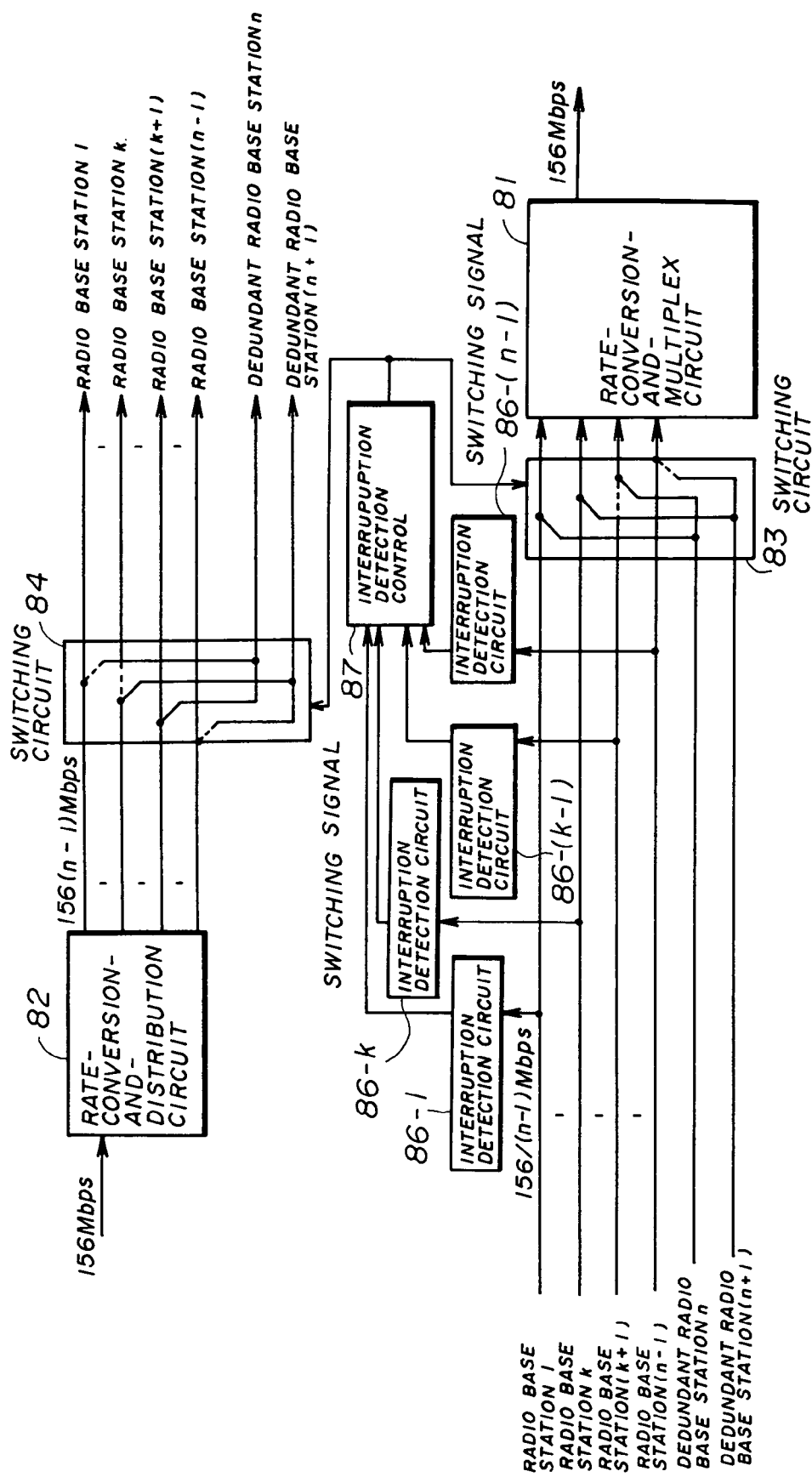
FIG. 13 shows a configuration example of a data-rate conversion part and radio base stations shown in FIG. 12.

Next, a description will be given of a fourth embodiment of the radio LAN system according to the present invention, by referring to FIG. 12 and FIG. 13. FIG. 12 shows a block diagram of the fourth embodiment of the radio LAN system according to the present invention. FIG. 13 shows a configuration example of a data-rate conversion part and radio base stations shown in FIG. 12. A terminal station 70 shown in FIG. 12 has substantially the same configuration as that of the data-rate conversion part and the radio base stations shown in FIG. 13.

The fourth embodiment of the radio LAN system shown in FIG. 12 has substantially the same operation as that of the third embodiment of the radio LAN system shown in FIG. 10. In the radio LAN system shown in FIG. 12, in addition to a plurality of conventional radio base stations 1 to n−1 (in an example of FIG. 12, to simplify the description, only the radio base stations 1, 2 are shown), a plurality of redundant radio base stations (radio base stations n, n+1) are provided.

In the fourth embodiment shown in FIG. 12, the operations, in which the signal transmitted from the wiring LAN system through the ATM-HUB is transmitted to a terminal station 70 through a data-rate conversion part 80 and the radio base stations 1 to n−1, and an operation that the signal produced from the terminal station 70 is transmitted to the wiring LAN system through the radio base stations 1 to n−1 and the data-rate conversion part 80, are substantially the same as the operations of the third embodiment of the radio LAN system shown in FIG. 10. Therefore, also in the fourth embodiment of the radio LAN system, between the radio base stations 1 to n−1 and the terminal station 70, the signals may be transmitted at the lower transmission rate.

Further, in the fourth embodiment shown in FIG. 12, different from the third embodiment shown in FIG. 10, the redundant radio base station n+1 is additionally provided. As shown in FIG. 13, the redundant radio base station n+1 with the redundant radio base station n is connected to a switching circuit 84. In the switching circuit 84, by an up-link monitoring mechanism constructed with interruption detection circuits 86-1 to 86-(n−1) and an interruption detection control circuit 87, data to be transmitted to the radio base station on an interrupted transmission path is controlled to be transmitted to the redundant radio base station n or the redundant radio base station n+1.

In the same way as a down-link transmission path, the redundant radio base station n+1 with the redundant radio base station n is connected to a switching circuit 83. In the switching circuit 83, by the down-link monitoring mechanism, instead of data transmitted from the radio base station through the interrupted transmission path, data transmitted from the redundant radio base station n or the redundant radio base station n+1 is selected and is provided to a rate-conversion-and-multiplex circuit 81.

In the above-discussed operation, when one of the transmission paths between the radio base stations 1 to n−1 and the terminal station 70 is interrupted, the redundant radio base station n is used. Further, when two of the transmission paths are simultaneously interrupted, the redundant radio base station n and the redundant radio base station n+1 are used.

As discussed above, in the fourth embodiment of the radio LAN system, in the same way as the radio LAN system shown in FIG. 10, advantages based on the lower-rate radio transmission may be obtained. Further, even when a plurality of transmission paths are simultaneously interrupted, the signal data of the interrupted transmission paths may be positively compensated.

In the fourth embodiment of the radio LAN system shown in FIG. 12, the two redundant radio base stations are provided. However, by providing an additional number of redundant radio base stations, data of an additional number of interrupted transmission paths may be compensated while obtaining the advantages based on the lower-rate radio transmission.

Further, the present invention is not limited to these embodiments, but other variations and modifications may be made without departing from the scope of the present invention.

What is claimed is:

1. A communication method for a radio LAN system providing communication at a first transmission rate, said method comprising:

time-divisionally distributing a first signal of said first transmission rate into n−1 second signals, wherein n is an integer≧3;

respectively converting said n−1 second signals into n−1 third signals of a second transmission rate less than said first transmission rate;

transmitting said n−1 third signals of said second transmission rate through radio transmission paths between n−1 radio base stations and a terminal station connected with at least one terminal unit, wherein said radio LAN system further comprises at least one redundant radio base station n;

transmitting a fourth signal through a radio transmission path between said terminal station and said at least one redundant radio base station n, data of said fourth signal having a given relationship with data in signals transmitted between at least, wherein k≦n−1, radio base stations of said n−1 radio base stations and said terminal station; and compensating, when at least one transmission path between said at least k radio base stations and said terminal station is interrupted, data of the signal to be transmitted through an interrupted transmission path based on said data of said fourth signal transmitted between said at least one redundant radio base station n and said terminal station.

2. A communication method for a radio LAN system providing communication at a first transmission rate, said method comprising:
- time-divisionally distributing a first signal of said first transmission rate into n–1 second signals, wherein n is an integer≧3;
- respectively converting said n–1 second signals into n–1 third signals of a second transmission rate less than said first transmission rate; and
- transmitting said n–1 third signals of said second transmission rate through radio transmission paths between n–1 radio base stations and a terminal station connected with at least one terminal unit, wherein said radio LAN system further comprises at least one redundant radio base station n;
- transmitting a fourth signal through a radio transmission path between said terminal station and said at least one redundant radio base station n, data of said fourth signal having a given relationship with data in signals transmitted between at least k, wherein k≦n–1, radio base stations of said n–1 radio base stations and said terminal station; and
- compensating, when at least one transmission path between said at least k radio base stations and said terminal station is interrupted, data of the signal to be transmitted through an interrupted transmission path based on said data of said fourth signal transmitted between said at least one redundant radio base station n and said terminal station, where said given relationship when transmitting the fourth signal is that said data of said fourth signal transmitted between said at least one redundant radio base station n and said terminal station is a summation of data of the signals transmitted between said at least k radio base stations and said terminal station for each given time slot.

3. A communication method for a radio LAN system providing communication at a first transmission rate, said method comprising:
- time-divisionally distributing a first signal of said first transmission rate into n–1 second signals, wherein n is an integer≧3;
- respectively converting said n–1 second signals into n–1 third signals of a second transmission rate less than said first transmission rate;
- transmitting said n–1 third signals of said second transmission rate through radio transmission paths between n–1 radio base stations and a terminal station connected with at least one terminal unit, wherein said radio LAN system further comprises at least one redundant radio base station n for transmission of data obtained by summing said n–1 signals;
- monitoring interruption of transmission paths between said n–1 radio base stations and said terminal station; and
- compensating, when one of said transmission paths is interrupted, data of an interrupted transmission path by transmitting said data of the interrupted transmission path between said at least one redundant radio base station n and said terminal station.

4. A communication apparatus for a radio LAN system providing communication at a first transmission rate, said apparatus comprising:
- rate-conversion-and-distribution means for time-divisionally distributing a first signal of said first transmission rate into n–1 second signals, wherein n is an integer≧3 and respectively converting said n–1 second signals into n–1 third signals of a second transmission rate less than said first transmission rate;
- n–1 radio base stations transmitting said n–1 third signals of said second transmission rate to a terminal station connected with at least one terminal unit through radio transmission paths;
- at least one summation means for generating a fourth signal by summing data of at least, wherein k≦n–1, signals of said n–1 third signals of said second transmission rate every timeslots for compensating data of the interrupted path between one of the radio stations transmitting said k signals and the terminal; and
- at least one redundant radio base station n transmitting said fourth signal generated in said at least one summation means to said terminal station.

5. A communication apparatus for a radio LAN system providing communication at a first transmission rate, said apparatus comprising:
- rate-conversion-and-distribution means for time-divisionally distributing a first signal of said first transmission rate into n–1 second signals, wherein n is an integer≧3 and respectively converting said n–1 second signals into n–1 third signals of a second transmission rate less than said first transmission rate;
- n–1 radio base stations transmitting said n–1 third signals of said second transmission rate to a terminal station connected with at least one terminal unit through radio transmission paths;
- at least one redundant radio base station n transmitting a signal to said terminal station for transmission of data obtained by summing said n–1 signals;
- line monitoring means for monitoring interruption of transmission paths between said n–1 radio base stations and said terminal station; and
- switching means, when at least one of said transmission paths is interrupted, for forwarding a signal to be transmitted through an interrupted transmission path to said at least one redundant radio base station n.

6. A terminal station used in a radio LAN system having rate-conversion-and-distribution means for time-divisionally distributing a first signal of a first transmission rate into n–1 second signals, wherein n is an integer≧3 and respectively converting said n–1 second signals into n–1 third signals of a second transmission rate less than said first transmission rate, n–11 radio base stations transmitting said n–1 third signals of said second transmission rate to said terminal station connected with at least one terminal unit through radio transmission paths, at least one first summation means for generating a fourth signal by summing data of at least k, wherein k≦n–1, signals of said n–1 third signals of said second transmission rate for every timeslot, and at least one redundant radio base station n transmitting said fourth signal generated in said at least one first summation means to said terminal station, said terminal station comprising:
- a receiver receiving said third signals of said second transmission rate transmitted from said n–1 radio base stations;
- rate-conversion-and-multiplex means for converting and multiplexing received third signals of said second transmission rate into signals of said first transmission rate;
- line monitoring means for monitoring interruption of transmission paths between said n–1 radio base stations and said terminal station;

at least one second summation means, when at least one of said transmission paths is interrupted, for generating a fifth signal by summing data of every timeslots of at least k signals of signals transmitted from said n−1 radio base stations except for a signal to be transmitted through an interrupted transmission path;

at least one subtraction means for generating subtraction data between data of the signal transmitted from said redundant radio base station n and data of said fifth signal generated in said second summation means; and switching means for providing said subtraction data generated in said subtraction means to said rate-conversion-and-multiplex means instead of providing data of an interrupted signal detected in said monitoring means; wherein even when at least one of signals transmitted from said n−1 radio base stations is interrupted, data of the interrupted signal is compensated.

7. A terminal station used in a radio LAN system having rate-conversion-and-distribution means for time-divisionally distributing a first signal of a first transmission rate into n−1 second signals, wherein n is an integer $\geqq 3$ and respectively converting said n−1 second signals into n−1 third signals of a second transmission rate less than said first transmission rate, n−1 radio base stations transmitting said n−1 third signals of the second transmission rate to said terminal station connected with at least one terminal unit through radio transmission paths, at least one redundant radio base station n transmitting a signal obtained by summing said n−1 third signals to said terminal station, first line monitoring means for monitoring interruption of transmission paths between said n−1 radio base stations and said terminal station, and first switching means, when at least one of said transmission paths is interrupted, for forwarding a signal to be transmitted through an interrupted transmission path to said at least one redundant radio base station n; said terminal station comprising:

a receiver receiving said third signals of the second transmission rate transmitted from said n−1 radio base stations;

rate-conversion-and-multiplex means for converting and multiplexing received third signals of the second transmission rate into signals of said first transmission rate;

second line monitoring means for monitoring interruption of transmission paths between said n−1 radio base stations and said terminal station; and second switching means, when at least one of said transmission paths is interrupted, for providing the signal transmitted from said redundant radio base station to said rate-conversion-and-multiplex means instead of providing a signal to be transmitted through an interrupted transmission path;

wherein even when at least one of signals transmitted from said n−1 radio base stations is interrupted, data of the interrupted signal is compensated.

* * * * *

UNITED STATES PATENT AND TRADEMARK OFFICE
CERTIFICATE OF CORRECTION

PATENT NO. : 7,095,711 B1  Page 1 of 1
APPLICATION NO. : 08/796752
DATED : August 22, 2006
INVENTOR(S) : Koji Arai It is certified that error appears in the above-identified patent and that said Letters Patent is hereby corrected as shown below:

Claim 1
Column 12, Line 61, change "least" to --least k--.

Claim 4
Column 14, Line 10, change "least" to --least k--.

Claim 6
Column 14, Line 47, change "n-11" to --n-1--.

Signed and Sealed this

Third Day of April, 2007

JON W. DUDAS
*Director of the United States Patent and Trademark Office*